Nov. 27, 1945.    S. H. CALDWELL ET AL    2,389,594
ELECTRIC CONTROL FOR MACHINE TOOLS
Filed Dec. 15, 1939    6 Sheets-Sheet 1

INVENTORS
S. H. Caldwell
J. J. Jaeger
R. Taylor
BY Joseph R. Schifield
ATTORNEY

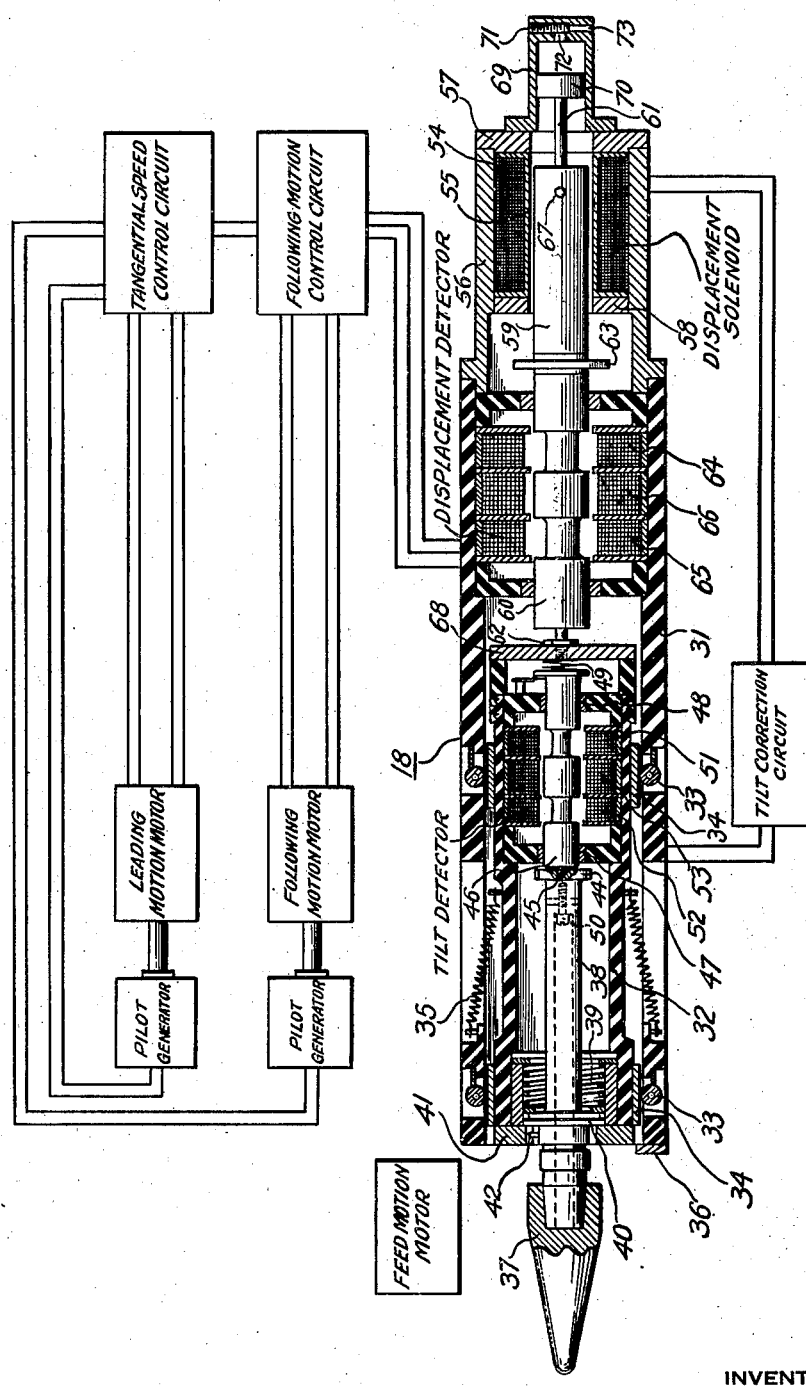

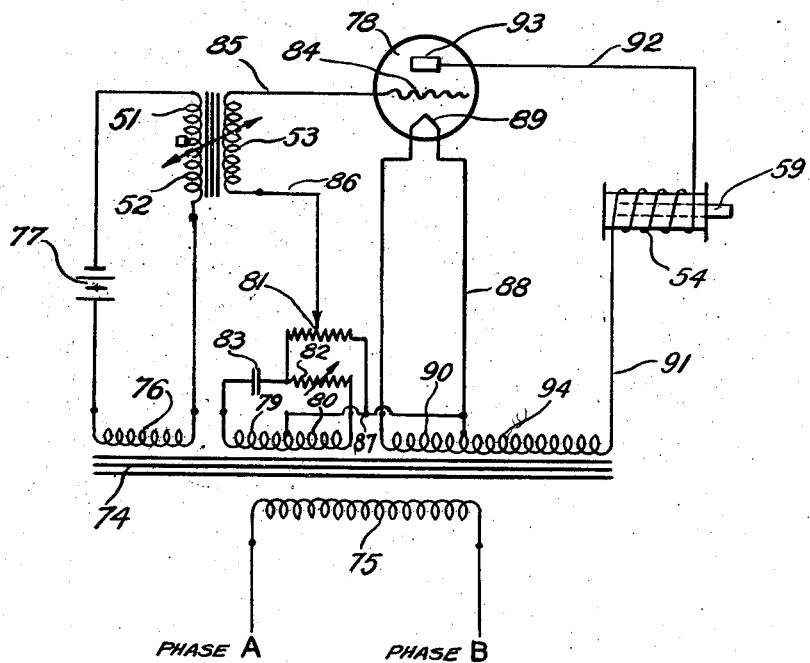
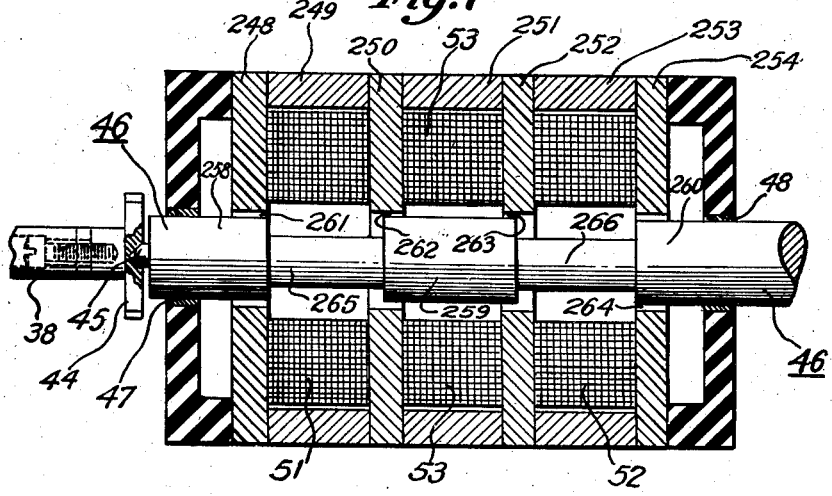

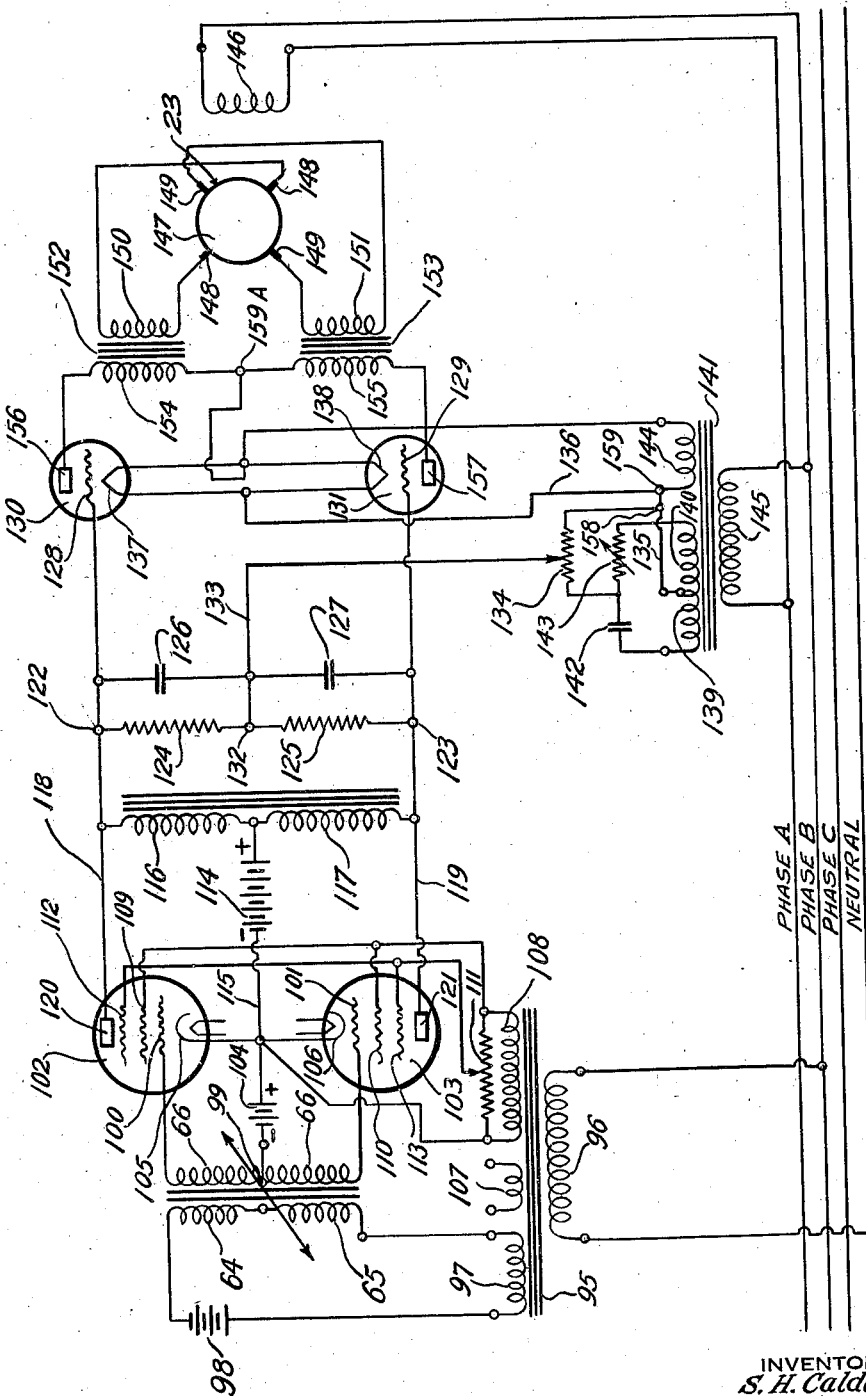

Nov. 27, 1945.　　S. H. CALDWELL ET AL　　2,389,594
ELECTRIC CONTROL FOR MACHINE TOOLS
Filed Dec. 15, 1939　　6 Sheets-Sheet 6

INVENTORS
S. H. Caldwell
J. J. Jaeger
R. Taylor
BY
Joseph K. Schofield
ATTORNEY

Patented Nov. 27, 1945

2,389,594

UNITED STATES PATENT OFFICE 2,389,594

ELECTRIC CONTROL FOR MACHINE TOOLS

Samuel H. Caldwell, Belmont, and Jacob J. Jaeger, Cambridge, Mass., and Richard Taylor, Great Neck, N. Y., assignors to Niles-Bement-Pond Company, Hartford, Conn., a corporation of New Jersey Application December 15, 1939, Serial No. 309,434

15 Claims. (Cl. 90—13.5)

This invention relates to metal cutting machines and particularly to tracer controlled machines adapted to cut irregular shapes such as bending and forging dies corresponding to a template or model thereof.

An object of the present invention is to provide a machine generally of the Keller die sinking type in which a model of the die is mounted for traversing by a tracer, the movements of the cutter over the work blank being controlled through thermionic means energized by slight displacement of a portion of the tracer during its traversing movements.

A feature of the invention that is important is that when the end of the tracer contacting the model is deflected slightly either laterally in any direction or axially backward, its movement serves to displace the pole piece of a pair of opposed electro-magnets and thereby unbalance induced voltages within windings of an adjacent or interposed induction coil, the resultant current within the last mentioned coil produced by the speed of movement of the pole piece to an unbalanced position and by its unbalanced position being employed to control movements of the tracer and cutter relative to the model and work piece.

Another object of the invention is to provide thermionic controlling machines for the speed and direction of rotation of one or more motors operating the moving slides for a die sinking or similar metal cutting machine, the maximum speed of one of the motors being limited to a predetermined speed and the speeds of the motors being controlled relative to each other so that the tangential speed of the tracer over the model and the cutter over the work piece may be maintained substantially constant and at a proper cutting speed.

More specifically the invention has for its main object an improved means and method for controlling the operative motions of the principal component slides of a Keller type die sinking machine particularly to enable these slides to move continuously but at variable speeds in a manner to accurately reproduce a model and to operate at such speeds that maximum production may be accomplished.

With the above and other objects in view, the invention includes the features of construction and operation set forth in the following specification and illustrated in the accompanying drawings.

In the accompanying drawings annexed hereto and forming a part of this specification, we have shown the invention embodied in one of the standard types of Keller die sinking machines, but it will be understood that the invention can be otherwise embodied and that the drawings are not to be construed as defining or limiting the scope of the invention, the claims appended to this specification being relied upon for that purpose.

In the drawings:

Fig. 3 is a longitudinal sectional view of one form of tracer assembly employed in the control system and shown in relation to the principal control circuits for the slide operating motors.

Fig. 4 is a diagrammatic view of the circuits for the tilt correction circuit indicated in outline in Fig. 3.

Fig. 6 is a diagrammatic view of the circuits showing the control of the following-motion motor from the displacement detector as shown in Fig. 3 and forming a part of the tracer.

Fig. 7 is an enlarged view of the tilt detector forming part of the tracer assembly shown in Fig. 3.

In the above-mentioned drawings there has been shown but one principal form of the invention and a modified form of tracer component which is now deemed preferable, but it is to be understood that changes and modifications may be made within the scope of the appended claims without departing from the spirit of the invention.

Briefly and in its preferred aspect, the invention may include the following principal parts: First, a machine having supporting means for a model and work blank and also supporting means for a tracer and a cutter, there being operating slides provided on the machine so that there may be movements of the tracer and cutter relative to the model and work piece respectively in the three directions of rectangular co-ordinates.

When the tracer of the present form of Keller die sinking machines is contacted by the model and tilted or moved axially a contact is closed and one of a pair of relays is operated which controls a motor to advance or retract the tracer and the cutter. The forward or leading motion of the tracer and cutter also is stopped while the cutter moves in or out. In this way movements directly toward and from the work may be made by the cutter. The forward motion is stopped regardless of the amount of correction required to accurately reproduce the form of the model. In a machine embodying the present invention the tracer may operate to speed a motor which controls the movement of the cutter to or from the work and to slow down a motor which controls the movement of the cutter across the work, this operation varying in degree as required by the particular correction or change of movement required. Also in such a machine the speed of the cutter over the work may be controlled so that it is of any predetermined and constant amount.

Control circuits hereinafter described operate two motors of the machine and each motor controls the movements of a slide. The tracer has opposed electromagnets and a common pole piece extending axially thereof, displacements of which energize circuits for these motors as will presently be more fully described, there being a control system for each motor so interlocked that the maximum speed of the one motor may be limited and the two motors may be controlled to operate at relatively different speeds.

Figure 1:
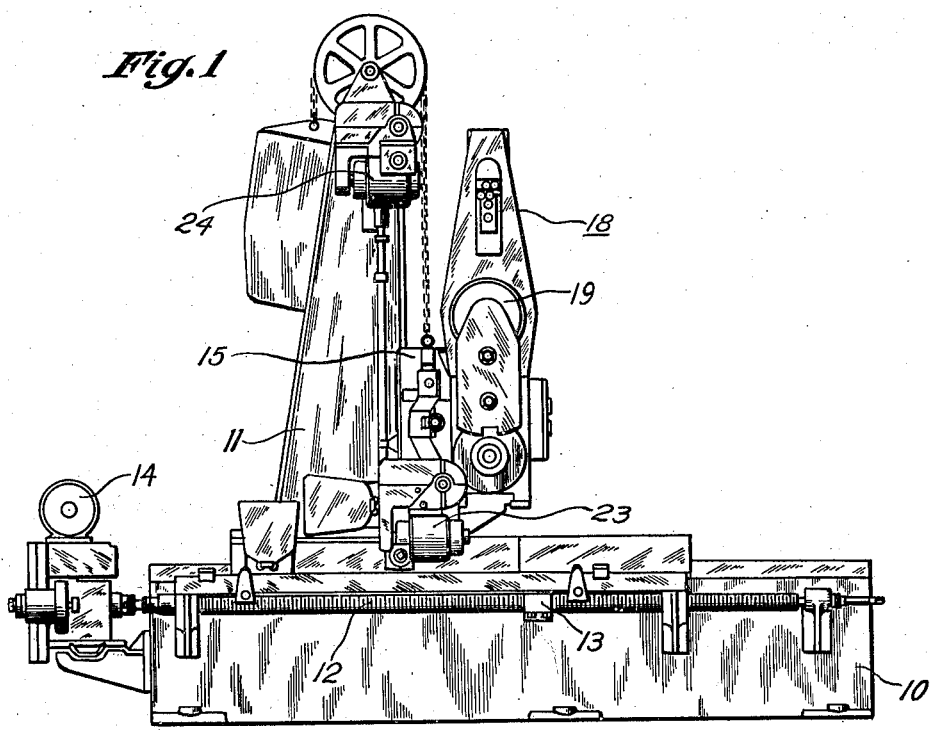
Figure 1 is a front view in elevation of a die sinking machine of the Keller type on which the present control mechanism has been incorporated.
Figure 2:
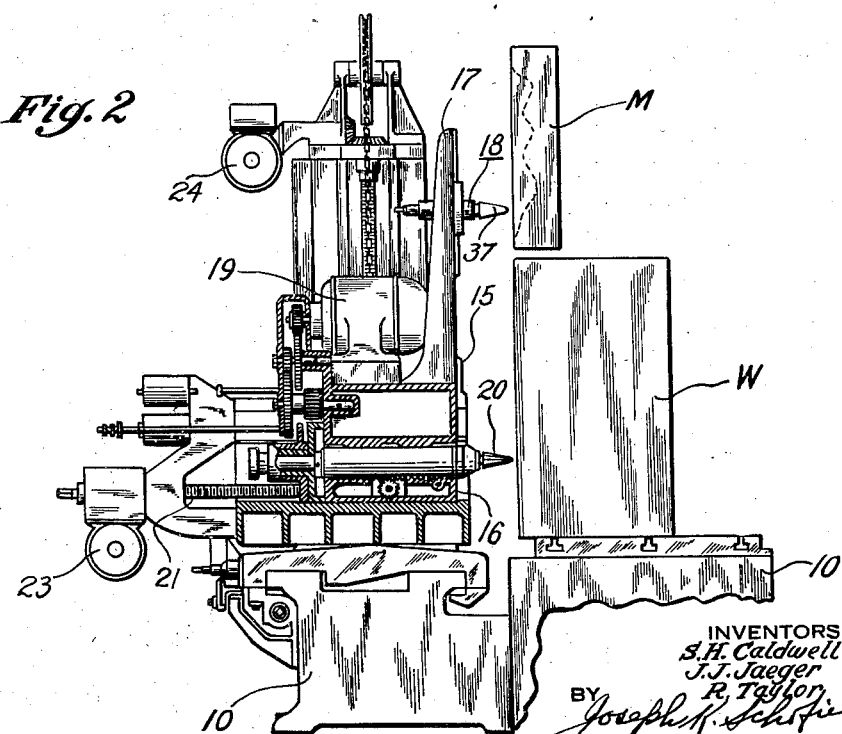
Fig. 2 is a side elevation of the machine shown in Fig. 1 with the work blank and model mounted in position for cooperation therewith.

Referring to Figs. 1 and 2 of the drawings, it will be seen that upon a fixed base 10 there is mounted a work blank W and a model or template M disposed directly above the work piece, both the work blank and template being held rigidly in fixed position upon the base by any suitable means not shown. Upon another portion of the base 10 and movable horizontally therealong is a heavy column 11 which may be traversed in either direction along the base through a suitable screw 12 and nut 13 connection by a motor 14 hereinafter referred to as the leading motion motor drivingly connected to the screw 12 at one end. On a vertical surface of the column 11 is slidably mounted a cutter head 15 suitably counterbalanced and having therein a cutter slide 16 movable horizontally toward and from the work blank W. Upon a bracket 17 fixed to and extending upwardly from this cutter slide 16 is mounted the body portion of the tracer 18 positioned for co-action with the model or template M. As the above parts are standard construction for die sinking machines of the Keller type, it is not thought necessary to describe them more in detail. It will be sufficient to state that there is a motor 19 preferably mounted on the horizontally movable cutter slide 16 by means of which the cutter 20 may be rotated and that this cutter slide 16 may be moved toward and from the work piece W by a screw 21, operated by a motor 23 hereinafter referred to as the following motor.

Also there may be provided a third motor 24 for raising and lowering the cutter head 15 upon the column 11 but this may not usually be controlled by the circuits forming the present invention and is employed more usually as a feed mechanism to advance the cutter 20 to new traversing positions at the end of movements of the column 11 in either direction. If desired, however, the motor controlling the vertical position of the cutter head 15 may be used as a leading-motion and the column 11 may be advanced slightly, horizontally at the end of the stroke of the cutter head 15 in either direction to effect the feed. In the embodiment selected for illustration it will be assumed that the movement of the column 11 along the base 10 is the leading motion and the horizontal movement of the cutter slide 16 toward and from the work piece W will be considered the following motion.

The tracer point 37, as seen in Fig. 3 when tilted by contact with a model, causes motion of the "tilt detector." The tilt detector establishes the fact that contact with the model has been made, but does not influence the following or leading motions directly. If the slope of the surface of the model being traversed is so small that the tracer point receives a considerable longitudinal component of force instead of being tilted, it will be shown later that this force can cause correction to take place directly and without going through the intermediate stage of causing the tilt detector to operate. There is, however, a class of work in which the force required to move the tracer point 37 longitudinally or axially is not available, but a tilting action is easily obtained, and this is the more general situation, which is to be described.

As soon as a tilt of the tracer point 37 occurs, a voltage is produced by the tilt detector dependent upon the amount of tilt produced, and this voltage is introduced to an electrical circuit called the "tilt correction circuit" (Fig. 3 and Fig. 4) in which it controls the action of a thermionic tube which supplies power to a "displacement solenoid" located within the main barrel of the tracer 18. When the displacement solenoid 54 is energized, it withdraws an inner barrel 32 within the detector, and in so doing, withdraws the tracer point 37 from the model M by the amount necessary to cause the tracer point to reseat itself in a position parallel to the barrel of the tracer and also parallel to the axis of the cutting tool. The motion produced by the energizing of the displacement solenoid 54 in straightening out the tracer point is also transmitted to a second detector within the tracer, known as the "displacement detector." The amount of displacement which pole piece 60 of the displacement detector receives is the amount of motion which would have been produced if it were possible for the model to push only longitudinally on the tracerpoint without tilting it. Hence, the motion of the displacement detector is a true measure of the error in position of the cutting tool at the instant of consideration. It is an important objective of the remainder of the control system to work with as small a signal of this type, that is, with minimum tilt or axial movement of tracer point 37, as possible so as to maintain a minimum error at all times.

Assuming, for the moment, that the leading motion is continuing at a constant rate, the output voltage of the displacement detector is transmitted to a "following-motion control circuit" (Fig. 3 and Fig. 6). Within this circuit, presently to be described more in detail, equipment is provided to control the torque, and, hence, the speed of the following-motion motor, so that the tracer point 37 will be moved over the model with a minimum of error indicated in the displacement detector. Means are also provided in the combined action of the displacement detector and the following-motion control circuit to improve the precision of following by detecting the rate of change of error and thereby anticipating corrections to the speed of the following-motion motor.

It is an important desideratum of the control system that the work should be followed not only with precision, but also at such speed that the cutting tool may at all times move tangentially over the surface of the work at substantially a constant predetermined speed. Since, in general, the slope of the work varies over a very wide range, it is necessary to control the speeds of both the leading motion and the following motion, in order to reach this objective.

In Fig. 3 pilot generators are shown schematically on both the following-motion motor and leading-motion motor but will be described more in detail as the description proceeds. These generators, rotating with their motor armatures, produce voltages proportional to the speeds of the motors to which they are attached. The outputs of the two pilot generators are transmitted as indicated in this figure to a "tangential speed control circuit" where the two speed voltages are combined in a manner, and used to provide bias voltages in the controls of both the following-motion and leading-motion motors so that the tangential speed produced by the two motors in combination is substantially constant.

Another principal element of the Keller machine is present in this system and that is the feed-motion motor. No special control of this motor is introduced, because it merely operates a fixed amount at the end of each cutting stroke. It should be pointed out, however, that any of the three motors present on the machine for moving the tracer and cutter in the directions of the rectilineal co-ordinates may perform any of the functions of leading motion, the following motion or the feed motion.

Referring to Fig. 3 of the drawings, the main assembly of the tracer is contained within an outer barrel or sleeve 31. An inner barrel 32 is free to slide within the outer barrel, and is supported by rollers 33, which are engaged by the flat plates 34, mounted on the inner barrel. Normally, the inner barrel is pulled toward the left as viewed in this figure by the springs 35. The amount of this motion toward the left is limited by the engagement of a flat plate 34 with a stop 36.

The tracer point 37 is fitted upon and forms, in effect, an integral part of the tilting spindle 38. The spring 39 presses the circular disc 40 mounted on the spindle 38 against a projecting seat 41 permitting the spindle 38 to tilt about a pivot point located at any point upon the periphery of the face of the plate 40. The tilting spindle 38 is prevented from rotating by means of the pin 42 slidable in a suitable slot.

At the extreme right end of the tilting spindle 38 is mounted the flanged piece 44 which contains a central cone. The cone engages against a ball 45 which is mounted in the end of the armature 46 of the tilt detector. The armature 46 is constrained against sidewise motion by the bearings 47 and 48 and can only move longitudinally against the action of the spring 49. Hence, any tilting of the spindle 38 causes a longitudinal motion of the armature 46 because of the action of the ball and cone coupling.

In order to secure an initial centering of the ball and cone coupling, the piece 44 which contains the cone is made detachable from the spindle 38 and clamped thereon by the clamping screw 50. By loosening the screw 50 and applying pressure to the right end of the armature 46, the ball 45 will seat itself centrally in the cone and at the same time, the plate 40 will seat against seat 41. The clamping screw can be tightened while the assembly is thus aligned.

The armature 46 is surrounded by two excitation coils 51, 52 and a pick-up coil 54, the action of which will be described at a later part of the specification.

A coil 54, hereinafter referred to as a displacement solenoid, is wound on a metallic bobbin 55, and located in the circular field structure consisting of the cylinder 56 and the two end plates 57 and 58. The armature 59 of the solenoid is drawn into the coil 54, that is toward the right as seen in Fig. 3, when the coil 54 is excited. The pull of the displacement solenoid armature is transmitted by a pin 67 to the shaft 61 which passes through a central hole extending through the solenoid armature 59 and the displacement detector armature 60. The shaft 61 is fastened to the end plate 68 of the inner barrel 32 and locked thereto by the lock nut 62. When the spindle 38 tilts and causes longitudinal motion of the armature 46, a voltage is induced thereby in coil 53 and this voltage is used to effect excitation of the displacement solenoid 54 which pulls on the solenoid armature 59, thereby pulling on the entire barrel 32 and moving the barrel and the spindle 38 back an amount necessary to enable the tilting spindle 38 to regain a seated position under the action of the spring 39.

The armature 60 of the displacement detector is fastened to the armature 59 of the solenoid with a non-magnetic spacer piece 63 disposed between them. The spacer piece 63 is introduced to prevent magnetic flux from solenoid armature 59 passing into detector armature 60 and thereby causing false indications.

The displacement detector is shown in the central portion of the tracer casing, and has excitation coils 64 and 65 and a pickup coil 66. Since the armature 60 of the displacement detector is mechanically coupled to the armature 59 of the displacement solenoid, any motion of the displacement solenoid armature is directly transferred to the displacement detector armature. Since this motion is the amount of longitudinal motion required to reseat the tilting spindle 38, it is a measure of the longitudinal error shown by the position of the tracer point. Since the displacement detector produces a voltage proportional to its own motion, the output of the entire tracer assembly shown in Fig. 3 is a voltage proportional in magnitude and direction to the error shown by the position of the tracer point 37. This statement is correct when A. C. excitation is applied to the coils 64 and 65 of the displacement detector. If, as will be shown later, combined A. C. and D. C. excitation is applied to these coils, the output of the tracer assembly in Fig. 3 is a voltage containing two components. The first is an A. C. component, proportional in magnitude and direction to the error in position indicated by the tracer point 37. The second is a variable voltage which is a measure of the rate of change of the error as indicated by the tracer point.

If the slope of the portion of the surface of the model being followed by the tracer point is small, so that the tracer point is moved axially rather than tilted, the longitudinal motion is transferred directly to the inner barrel 32 by way of the springs 39 and 49. This motion then reaches the armature 60 by way of the rod 61, pin 67, solenoid armature 59 and spacer 63. If the combined action of the springs 49 and 39 is not sufficient to prevent motion of the spindle 38 relative to the barrel 32, the result is a displacement of the detector armature 46. The resulting signal voltage acts just as though the detector motion was due to tilting of spindle 38 and the displacement solenoid will aid in producing the displacement.

Mechanical vibration of the movable parts is checked by the dash pot 69, containing the piston 70 mounted on the rod 61. The effectiveness of the dash pot is controlled by the screw 71, which controls the size of the leakage path between the ports 72 and 73.

Fig. 4 shows details of the tilt correction circuit. A primary 75 of a transformer 74 is excited from phase A and B of a three-phase circuit (see Fig. 6). Secondary coil 76 in series with a battery 77 supplies the excitation coils 51 and 52 of the tilt detector. The pickup coil 53 of the tilt detector delivers its signal to the grid circuit of the gas tube 78. This grid circuit also receives an A. C. bias of adjustable magnitude and phase obtained from the secondary windings 79 and 80 of the transformer 74. The magnitude of the grid bias is adjusted by the potentiometer 81 and the phase is adjusted by the variable resistor 82 and the condenser 83. The grid circuit of tube 78, hence, consists of the grid 84, the conductor 85, the pickup coil 53, the conductor 86, the potentiometer 81, the conductor 87, the conductor 88, and the cathode 89. The cathode 89 of tube 78 may be heated by secondary 90 of transformer 74. The plate circuit of tube 78 is supplied by the voltage from secondary winding 94 and consists of the plate 93, conductor 92, displacement-solenoid coil 54, conductor 91, supply coil 94, conductor 88, and cathode 89.

Theoretically the magnitude and phase of the A. C. grid bias obtained from secondaries 79 and 80 should be adjusted so that, with no voltage produced in the pickup coil 53, the tube 78 does not conduct. This is the condition when the tilt spindle 38 is in its undisturbed central position, and under this condition no current flows in the displacement solenoid coil 54. The A. C. bias in the grid circuit of tube 78 is furthermore adjusted as described in copending application of Caldwell et al. Serial No. 290,404, filed August 16, 1939, so that the voltage induced in coil 53 by the primary coils 51, 52 combines in proper relation with the bias voltage to cause tube 78 to conduct an amount of current approximately proportional to the voltage induced in the pickup coil 53. The plate current of tube 78 thus controlled passes through the displacement solenoid coil 54, by which the barrel 32 of the tracer assembly is withdrawn and the spindle 38 caused to regain a central position.

The A. C. bias from secondaries 79 and 80 is preferably adjusted experimentally. It is necessary to cause motion of the solenoid armature 59 by a very small voltage from the tilt detector. If the tube 78 is initially biased to non-conduction, internal mechanical friction will prevent the sensitive response desired. Therefore, the initial A. C. bias is adjusted so that the tube is slightly conducting, not enough to cause motion of the armature 59, but enough to cause motion by a very small increase of plate current due to a signal from the tilt detector. The excitation of coils 51 and 52 by a combination of alternating current from secondary 76 and direct current from battery 77 is effected for the purpose of producing a voltage in pickup coil 53 proportional to the velocity of the armature 46. This results in much more stable operation by making it possible for the detector to anticipate motion of its armature and thus cause a larger current to flow in the solenoid coil 54 in order to prevent excessive displacement.

Fig. 6 shows the circuit which places the following-motion motor 23 under direct control of the displacement detector in the tracer assembly 18. Transformer 95 has its primary 96 excited between phase B and the neutral of a three-phase alternating current power supply. The secondary 97 in series with the battery 98 supplies excitation to coils 64 and 65 of the displacement detector. Due to the combination of an A. C. and D. C. excitation, the output coil 66 of the displacement detector contains a voltage which is a measure of both the position and the rate of change of position of the displacement detector armature 60.

The pickup coil 66 has a center tap 99. The outer terminals of the coil 66 are connected to the control grids 100 and 101 of pentodes 102 and 103 respectively. The center tap 99 connects through the bias battery 104 to the cathodes 105 and 106 of the pentodes 102 and 103 respectively. The cathodes of both pentodes are heated by the winding 107 of transformer 95 by conventional connections which are not shown. An A. C. voltage supplied by coil 108 of transformer 95 is impressed between the screen grids 109 and 110 and their cathodes 105 and 106, and a portion of the voltage from winding 108 is taken off by means of potentiometer 111 (or by means of a tap on winding 108) and is applied between suppressor grids 112 and 113 and cathodes 105 and 106 respectively. The plate voltage of the pentodes is supplied by battery 114 with the complete plate circuit as follows: starting at cathodes 105 and 106, through conductor 115, through plate battery 114, through plate load reactances 116 and 117 respectively, through conductors 118 and 119 respectively, to the plates 120 and 121 respectively of the pentodes 102 and 103.

Considering the action of the circuit so far described, the voltage between the control grids 100 and 101 and their respective cathodes is composed of an A. C. voltage proportional to the displacement of the tracer and a voltage varying from instant to instant with the speed of the tracer displacement. Due to the A. C. biases which are imposed upon the screen grids 109 and 110 and the suppressor grids 112 and 113, the voltages which appear across the load reactances 116 and 117 are composed of the original A. C. signal amplified, plus the original variable voltage signal due to the D. C. excitation of the detector, amplified, plus the original variable voltage signal modulated at the frequency of the A. C. voltages applied to the shield and suppressor grids of the pentodes, plus distortion components due to the tube characteristics, which do not affect the operation.

The voltages just described appear between the terminals 122 and 123 where they cause proportional currents to flow in the resistors 124 and 125. The condensers 126 and 127 are placed across the resistors 124 and 125 which serve to smooth out undesired high-frequency variations which may occur. The grids 128 and 129 of the gas triodes 130 and 131 are connected to the points 122 and 123 respectively. The grid circuits of the gas triodes are completed through the center connection 132 between resistors 124 and 125, through conductor 133, through potentiometer 134, through conductor 135, through conductor 136, to the cathodes 137 and 138 of the gas triodes. An A. C. bias is introduced in the grid circuits of tubes 130 and 131 from the secondary windings 139 and 140 of transformer 141.

The condenser 142 and variable resistor 143 serve to adjust the phase of the A. C. bias and the potentiometer 134 is used to adjust the magnitude of the A. C. bias. Winding 144 of the transformer 141 is used to heat the cathodes of the two gas tubes. The primary winding 145 of transformer 141 is connected between phases A and B of the three-phase supply, and is so polarized that there is a 30° phase angle between the primary voltages on transformer 141 and transformer 95.

The plate circuits of the two gas triodes 130 and 131 are similar to those described in the above-referred to copending patent application and include the secondary coils 154, 155 of the two transformers 152, 153. The following-motion motor is a reversible repulsion motor, having a stator winding 146 connected between phases A and B of the three-phase primary supply. The rotor 147 of this motor has two sets of brushes 148 and 149, which are connected to the primary windings 150 and 151 of transformers 152 and 153 respectively. The secondaries 154 and 155 of these transformers supply plate voltage to plates 156 and 157 respectively with the junction point 159a connected to the cathodes of the gas triodes.

With the armature 60 of the displacement detector shown in Fig. 3 in the balance position so that no A. C. voltage appears across the pickup coil 66, and with the tracer point stationary, the voltage across terminals 122 and 123 is substantially zero. Under these conditions, the A. C. biases on the grids of the gas triodes 130 and 131 are adjusted by means of potentiometer 134 and resistor 143 so that both tubes are slightly conducting. The plate voltages for these tubes are derived from the armature voltages across the brushes 148 and the brushes 149, and through the transformers 152 and 153. Since both gas triodes 130 and 131 are slightly conducting, substantially equal currents flow through both sets of brushes on the following-motion motor, and the motor remains stationary.

If the armature 60 of the displacement detector is moved slightly in either direction from its balanced position, a voltage proportional in magnitude and direction (and also a voltage proportional to the speed of motion) is produced across the terminals 122 and 123, and combines with the A. C. grid bias in the grid circuit of the gas triodes, causing the grid voltage of one triode to shift in phase and magnitude in such a manner that its plate circuit conducts a larger current, and causing an opposite change in the grid voltage of the other gas triode, so that its plate circuit conducts less plate current. There is, hence, a greater current caused to flow in one brush circuit of the repulsion motor than in the other, and the motor will rotate in the direction determined by which brush circuit is thus excited. If the armature 60 of the displacement detector had moved in the opposite direction, the direction of rotation of the rotor 147 would have been reversed.

Under this system of control, the amount of current flowing in the plate circuit of whichever gas triode is conducting depends on the amount of displacement of the armature 60 of the displacement detector, so that the torque, and hence, the speed of the rotor 147 is controlled by the displacement detector. Because of the D. C. excitation applied to the displacement detector, the torque and speed of the following-motion motor is also influenced by the speed at which the armature 60 moves. Furthermore, the signal produced by the velocity of the displacement detector is in such direction as to prevent oscillation and overshoot of the following motion. If the error, that is the movement of the tracer from normal, is increasing, the voltage proportional to the speed of the tracer point will be in the direction required to prevent further increase in error. If the error is decreasing, the voltage proportional to the speed of the tracer point tends to cause the error to decrease slowly, and hence, prevents a rapid movement through the zero error position which would cause overrunning and oscillation of the following motion.

Figure 5:
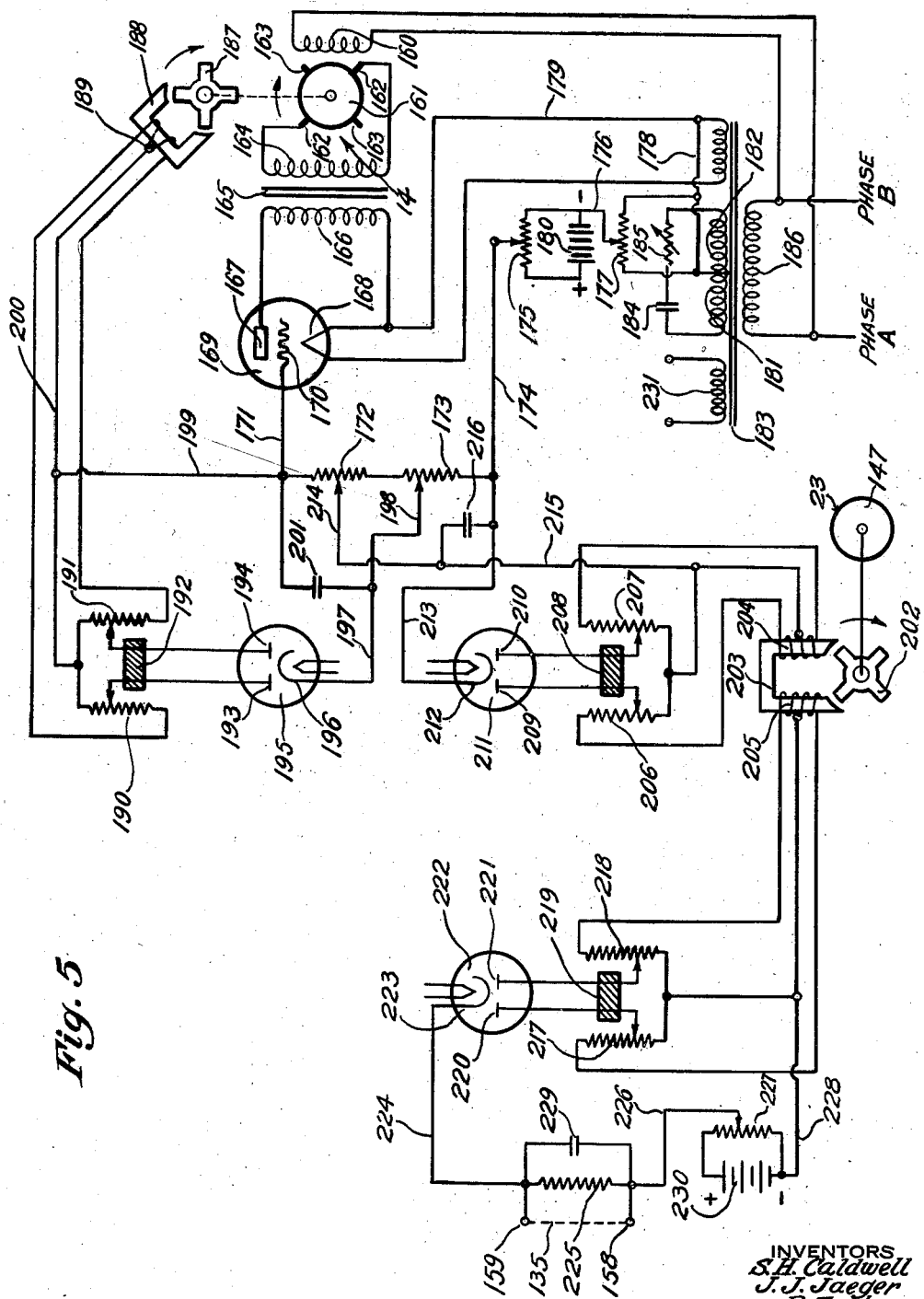
Fig. 5 is a diagrammatic view of the circuits for controlling the relative speeds of the motors for operating the tracer and cutter moving slides.

The operating speed of the following-motion motor is primarily dependent upon the position and speed of the armature 60 of the displacement detector. In operating on an actual machine, it is, of course, also dependent upon the speed of the leading motion motor. Furthermore, it is desirable to control the maximum speed of the following-motion motor and to relate the speed of the following-motion motor relative to that of the leading-motion motor, so that the tangential speed of the tracer over the model and hence, of the cutter over the work, will be substantially constant. This control is described in connection with Fig. 5, and ties in with the circuit diagram of Fig. 6 at the points 158 and 159, which are the terminals of the conductor 135. Connection points 158 and 159 are indicated in both Figs. 5 and 6. Conductor 135 is shown solid on Fig. 6, since this connection is necessary for the operation of the circuit as described up to that point. In Fig. 5, strap connection 135 is shown dotted between the points 158 and 159, indicating that when the tangential speed control circuit of Fig. 5 is used, the connection 135 is removed, and point 158 on Fig. 5 is connected to point 158 on Fig. 6, and point 159 on Fig. 5 is connected to point 159 on Fig. 6.

Referring to Fig. 5, the leading-motion motor 14 is also a repulsion motor (since it normally operates continuously in one direction, only one set of brushes is shown in use). The stator winding 160 of the leading-motion motor is excited from phases A and B of the three-phase power supply shown in Fig. 6. The rotor 161 has brush sets 162 and 163, only one pair of which is used at one time. By means of a double-pole, double-throw switch, not shown in the diagram, the connections on brushes 162 can be switched to brushes 163 when it is necessary to reverse the direction of the leading-motion motor at the end of each cutting stroke. The rotor voltage of the leading-motion motor 14 is applied to the primary 164 of transformer 165 and the voltage thus induced in secondary 166 is applied between the plate 167 and the cathode 168 of the gas triode 169. The grid circuit of the gas triode 169 consists of the grid 170, the conductor 171, the potentiometer 172, the potentiometer 173, the conductor 174, the potentiometer 175, the conductor 176, the potentiometer 177, the conductor 178, the conductor 179 and the cathode 168. Potentiometer 175 is used to supply part of the voltage of the battery 180 as a D. C. bias in the grid circuit. The windings 181 and 182 of transformer 183 supply, under the control of condenser 184, variable resistor 185 and potentiometer 177, an A. C. bias of adjustable magnitude and phase in the above-described grid circuit of tube 169. The primary 186 of transformer 183 is supplied by phases A and B of the three-phase A. C. supply in Fig. 6.

Rotating with the rotor 161 of the leading-motion motor 14 is the multipole magnet 187 which has its magnetic circuit completed by the yoke 188, and, by rotation, produces a voltage in the center-tapped pickup coil 189. This is the pilot generator shown attached to the leading-motion motor in the schematic drawing in Fig. 3, and is similar to the pilot generator described in connection with the above-referred to application for a motor control system. The output voltage of the coil 189 is connected across the potentiometers 190 and 191, and a portion of this voltage is picked off by means of the slider assembly 192, and is applied across the plates 193 and 194 of the full-wave rectifier 195. The cathode circuit of the rectifier 195 is completed by way of the cathode 196, the conductor 197, the potentiometer slider 198, part of the potentiometer 173, the potentiometer 172, the conductor 199, the conductor 200, and then back to the center tap of coil 189. Condenser 201 is placed across the load resistance of rectifier 195, this load resistance consisting of all of potentiometer 172 and a portion of potentiometer 173, as determined by the location of the slider 198. The condenser 201 serves to reduce the fluctuations of the rectified D. C. voltage across this load resistance. Due to rotation of the magnet 187, a voltage induced in coil 189 is then rectified and appears across the load resistance of rectifier tube 195 as a substantially D. C. voltage. It should be noted that the load resistance of this tube 195 is also a component of the grid circuit of gas tube 169, and this speed voltage is, therefore, introduced in the grid circuit of the gas tube 169.

Rotor 147 of the following-motion motor 23 has a similar pilot generator mechanically rotated with it, consisting of the magnetic rotor 202, the yoke 203, and the two center-tapped pickup coils 204 and 205. The output of coil 204 is connected to potentiometers 206 and 207, and a portion of this voltage is picked off by the slider assembly 208 and applied to the plates 209 and 210 of rectifier 211. The cathode circuit of rectifier 211 is completed by way of the cathode 212, the conductor 213, the potentiometer 173, a portion of potentiometer 172, the slider 214, the conductor 215 and back to the center tap of the coil 204. Condenser 216 is connected across the load resistance of rectifier 211 to smooth the rectified voltage across the load resistance which, in this case, consists of all of the potentiometer 173 and that part of the potentiometer 172 determined by the location of slider 214. It should be noted that this load resistance is also in the grid circuit of gas tube 169, so that, due to rotation of the following-motion motor 147, a voltage is picked upon coil 204, rectified in rectifier 211 and applied to the grid circuit of the gas tube 169.

With neither the leading-motion motor 14 nor the following-motion motor 23 rotating, the bias voltages in the grid circuit of tube 169 are adjusted by means of potentiometers 175 and 177 and resistor 185, so that the gas tube begins to conduct at the beginning of the positive half-cycle of its plate voltage. Under these conditions, the rotor 161 of the leading-motion motor exerts maximum torque and begins to rotate. As its speed builds up, the voltage induced in coil 189 increases and, because of the connections described above, introduces a rectified D. C. voltage proportional to the speed in the grid circuit of the gas tube 169. This speed voltage is polarized in such a direction as to cause the plate circuit of the gas tube to conduct at a later point in the cycle and thus reduce the current in the armature of the rotor 161. Due to this reduction of torque as the speed builds up, the rotor 161 eventually reaches a maximum speed which can be controlled by the position of the slider assembly 192. The condition thus described is that required for the following of a flat surface parallel to the plane of movement of the slide moved by leading motor 14 and which produces no motion of the tracer point towards or from the pattern. This leading-motion motor 14 will simply drive the cutter over the work at a constant speed, determined by the setting of the slider 192.

If there is a change in the shape of the model, which causes a motion of the tracer point, the rotor 147 of the following-motion motor 23 will turn at whatever speed is required to maintain precision of the following motion. In doing so, it rotates the pilot generator magnet 202, induces a voltage in coil 204, which is rectified, and causes a D. C. voltage proportional to the speed of rotor 147 to appear in the grid circuit of tube 169. This D. C. voltage combines with the D. C. voltage produced by the rotation of the leading-motion motor, and causes a decrease in the speed of the leading motion motor 14. By adjustment of the sliders 192, 208, 198 and 214, it is possible to combine the contributions from the two pilot generators so that the sum of the squares of the speeds of the leading-motion motor 14 and of the following-motion motor 23 is maintained substantially constant. Under these conditions, the tangential speed of the tracer and cutting tool over the surface of the model and the work, respectively, is at all times substantially constant, thus achieving one of the primary objectives of this invention. The relative adjustments of sliders 192, 208, 198 and 214 are also established in such manner as to cause the leading-motion motor 14 to stop rotating entirely whenever the speed of the following-motion motor 23 reaches a value which indicates that an extreme slope of the model is being followed.

Another voltage proportional to the speed of the following-motion motor 23 is produced in the coil 205 and applied to the potentiometers 217 and 218. A portion of this voltage is picked off by the slider assembly 219 and applied to the plates 220 and 221 of the rectifier 222. The cathode circuit of this rectifier 222 is completed from the cathode 223, through conductor 224, through resistance 225, through conductor 226, through potentiometer 227, through conductor 228, back to the center tap of coil 205. Condenser 229 is connected across resistance 225 to smooth the rectified D. C. voltage which appears there. Potentiometer 227 introduces a part of the voltage of battery 230 in series with the load circuit resistance 225 of rectifier 222. The polarity of battery 230 and the magnitude of the voltage across potentiometer 227 are adjusted so as to prevent any current from flowing in, and hence, any voltage from appearing across resistor 225 until after the speed of the following-motion motor exceeds a desired value, which is determined by the setting of the slider on potentiometer 227.

The rectified D. C. voltage across resistance 225 appears across terminals 158 and 159 in Fig. 5, as is described above. This voltage can be applied to the like-numbered terminals, 158 and 159, in Fig. 6 by connecting similarly-numbered points in the two figures and removing the strap conductor 135. The effect of this connection is to introduce a D. C. speed control voltage in the grid circuit of gas tubes 130 and 131 (Fig. 6), and thereby control the maximum speed of rotation of the rotor 147 of the following-motion motor 23. The control which is described does not operate on the following-motion motor at all speeds, but begins to act only at a speed determined by the magnitude of the delay bias introduced from potentiometer 227 (Fig. 5), and constitutes means to prevent over-speeding of the following-motion motor 147 when considerable departure of the tracer point 37 from its neutral position is experienced.

The winding 231 (Fig. 5) on transformer 183 is used to heat the cathodes of rectifiers 195, 211 and 222, by conventional connections, which are not shown in the drawings.

In the above description one tracer assembly and tilt detector and the movable parts therein have been referred to generally and their operation has been explained. This tracer will now be described in detail, particularly the tilt detector referred to above and shown in an enlarged sectional view in Fig. 7. The armature consists of the shaft 46, on which are mounted the cylinders or spools 258, 259 and 260. These cylinders may be integral parts of shaft 46 or mounted in position on the shaft. All parts of the armature and field structures are made of iron or steel having suitable magnetic properties. The field structure consists of the disc 248, the ring 249, the disc 250, the ring 251, the disc 252, the ring 253 and the disc 254 suitably clamped in alignment. The cylinders 258, 259 and 260 on the armature are all of the same diameter and the central holes in the discs 248, 250 and 252 and 254 are in the particular embodiment shown all of another constant diameter. This arrangement forms a magnetic bridge which is excited by the coils 51 and 52 previously referred to, and coil 53 is the pickup coil, but the functions of these two sets of coils may be interchanged.

The armature is shown in its balanced position in Fig. 7, when the central cylinder 259 is symmetrically located with respect to discs 250 and 252 and the cylinders 258 and 260 are symmetrically located with respect to discs 248 and 254, respectively. Under these conditions, the magnetic fluxes, due to coils 51 and 52, pass radially inwardly in equal amounts through discs 250 and 252, across the air gaps 262 and 263 and then longitudinally to the left and right respectively through cylinder 259, thence through shaft sections 265 and 266. These magnetic fluxes are balanced and thus no flux passes through cylinder 259.

It will be noted that cylinder 259 carries two components of magnetic flux, due to the coils 51 and 52 respectively, but these are polarized in opposite directions so that the resultant flux in cylinder 259 is the difference between the two components. The balance point of the magnetic bridge may now be defined electrically rather than by its centrally disposed relation to the discs and rings 248 to 254 by saying that it is the point at which the resultant flux through cylinder 259 becomes zero. Under these conditions, the resultant flux linked by the pickup coil 53 is zero.

If, now, the armature in Fig. 7 is moved slightly to the right, the reluctance of the air gap 263 between cylinder 259 and disc 252 decreases and the reluctance of the air gap 262 between this cylinder and disc 250 increases. As shown in Fig. 7, the reluctance of air gap 261 between disc 248 and cylinder 258 will remain substantially constant while the reluctance of air gap 264 between disc 254 and cylinder 260 will increase; by using suitable dimensions for the cylinders 258 and 260, these air gaps may both be made to change with mechanical motion also, so as to make the magnetic bridge more sensitive to mechanical motion. Following through the changes described when the armature is shifted slightly to the right, it will be observed that the flux due to coil 51 is increased, while the flux due to coil 52 is decreased and that a portion of the flux due to the coil 51 will pass radially inwardly of the plate 252 and return through the cylinder 259. The flux passing through the cylinder 259 is linked by coil 53, and a voltage is, therefore, induced in the latter coil. A voltage of opposite phase is induced if the armature 46 is shifted in the opposite direction from its balance point.

The detector thus described may also be operated with combined alternating and direct current excitation so as to produce a voltage in coil 53 which varies both with the position of the armature and with its velocity.

Figure 8:
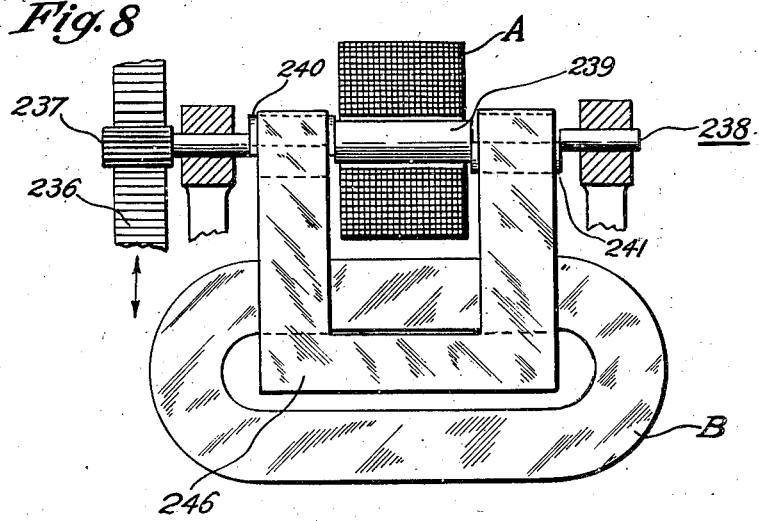
Fig. 8 is a longitudinal view of a modified form of detector adapted for indicating slight angular movements instead of axial movements as in Fig. 7.
Figure 9:
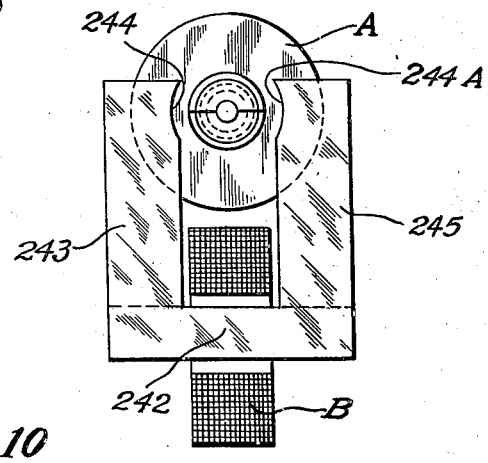
Fig. 9 is an end view of the detector shown in Fig. 8.
Figure 10:
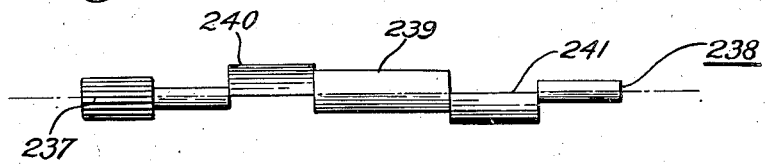
Fig. 10 is a detail longitudinal view of the armature shown in Figs. 8 and 9.

Referring now to the form of tilt detector shown in Figs. 8, 9 and 10 it will be seen that in this form the detector operates by rotation of an armature instead of by axial movement as in the embodiment described above. The tracer, or other member, movements of which are to be made use of, may be connected to rack 236 so that this rack is moved axially by slight movements of the tracer point 37 in any direction. A pinion 237 meshing with rack 236 is rotated by the axial movements of the rack. The pinion as shown in Fig. 8 is at one end of an armature 238 suitably mounted for oscillation or rotation within bearings.

This detector device also is an extension of the principle of the bridge to magnetic circuits as described in connection with the detector described above. Coil B when used as the excitation coil, is analogous to the source of electromotive force in the conventional bridge, and coil A, when used as a pickup coil, is analogous to the detector in a conventional bridge. The functions, however, of coils A and B may be interchanged.

If current is passed through coil B, magnetic flux is set up due to the magneto-force of the winding. Considering Figs. 8 and 9, one path which the magnetic flux will follow will be through the transverse yoke 242, upright piece 243, pole face 244 to the semi-cylindrical member 240, the upright piece 245 and back to transverse yoke 242. This is the path followed at the left end of the armature and there will be a similar path for the flux at the right end of the armature in Fig. 8.

If the armature is in the position shown in Figs. 8 and 9 so that equal amounts of the periphery of half-cylinder 240, as best seen in Fig. 10, are exposed to its pole faces 244 and 244a, the reluctances of its two air gaps will be exactly equal because of the symmetry of the arrangement. When this condition holds, an exactly similar condition holds at the opposite end of the armature in connection with second half-cylinder 241. Under these conditions the magnetic bridge is in a balanced condition and no magnetic flux tends to pass along the armature section 239 which is linked by the coil A from one half-cylindrical portion to the other. Hence, no voltage is induced in the pickup coil A.

If the armature 238 is rotated by a slight amount, say in the clockwise direction, as viewed in Fig. 9, the reluctance of the air gap on one side decreases and that of the air gap on the other side increases. A similar effect takes place at the opposite end of the armature, but in a diagonal sense. The air gaps diagonally opposite each other have a decreased reluctance, because the half-cylinders 240 and 241 are 180° out of phase, one with the other. Under these conditions, the magnetic circuit becomes unbalanced, and part of the flux passes through the armature section 239 and returns through the longitudinal yoke 246. The direction of the flux passing through section 239 depends on the direction in which the armature 238 is rotated from its balanced position. Since the armature section 239 is linked by the coil A, a flux is induced in coil A directly proportional to the flux in the armature section 239. In practice, an alternating voltage is induced in coil A because an alternating current is commonly used to excite coil B. The voltage induced in coil A, with a constant alternating current excitation on coil B, is proportional to the amount of mechanical rotation of the armature 238 over a range which is sufficiently large to be useful in the detection and measurement of small amounts of mechanical motion.

The device as above described is applicable for detecting or measuring mechanical motion of a tracer or other member when alternating current excitation is used. If, instead of a simple alternating current excitation, a combination of alternating and direct current excitation is used, the same principles apply separately to both components of the flux which is produced. In measuring and detecting the angular position of the armature 238, however, only the alternating current component flux is effective in inducing a voltage in coil A, because the voltage thus generated must depend on the rate of change of flux linking the coil. If, however, the armature is in motion instead of stationary, the voltage induced in coil A will contain an alternating component which will vary with the instantaneous position of the armature and, in addition, a voltage which varies as the angular velocity of the armature. This is an extremely useful feature of the detector for application to automatic control of related motions. The combined A. C. and D. C. excitation may be produced either by mixing the two currents externally or by using two separate excitation coils instead of the single coil such as coil B, and applying A. C. excitation to one coil and D. C. excitation to the other.

There are certain classes of work in which a cutter is to be moved in an irregular path which may be satisfactorily accomplished by the automatic control of one motor only. That is, the motor 23 having its speed and direction of rotation controlled by the tracer and the circuits shown in Fig. 6 may be used for moving the cutter in one direction, while the leading-motion is accomplished by any manual or power-driven means, operating at a generally constant speed and not requiring any of the electrical control mechanisms shown in Fig. 5 for the operation of the leading-motion motor 161.

In the application of this portion of the present invention to a machine tool, the motion controlled by or from the tracer preferably would result in movements of the tracer and cutter toward and from the model and work blank. The motions of the cutter in the other directions of rectilinear coordinates would be independently controlled in any desired manner.

What we claim is:

1. A tracer controlled machine tool having motor operated movable members, a tracer having a tracer point movable in any direction, an inductive device electrically sensitive to movement of said tracer point, means to apply a combined alternating and constant excitation to said inductive device, motors for moving said members, and controlling means for at least one of said motors actuated by a resultant voltage of said inductive device dependent partially upon the rate of change of displacement of said tracer point.

2. A tracer controlled machine tool having motor operated movable members, a tracer for controlling movement of one of said members, said tracer having a tracer point movable in any direction, an inductive device electrically sensitive to movement of said tracer point, means to apply a combined alternating and constant excitation to said inductive device, motors for moving said members, and controlling means for at least one of said motors actuated by a resultant voltage of said inductive device dependent partially upon the rate of change of displacement of said tracer point and partially upon the distance moved by said tracer point.

3. A tracer controlled machine tool having motor operated movable members, a tracer for controlling movement of one of said members, said tracer having a tracer point movable in any direction, an inductive device having at least one coil and a pole piece moved relative to said coil by movement in any direction of said tracer point, means to continuously apply a combined alternating and constant excitation to said coil, motors for moving said members, and controlling means for at least one of said motors actuated by resultant voltages in said inductive device induced by movements of said pole piece.

4. A tracer controlled machine tool having motor operated movable members comprising in combination, a tracer body member, a tracer point mounted therein for movement in any direction, an electro-magnetic coil within said body member, an induction coil adjacent said first mentioned coil, a pole piece within said coils movable in one direction by movement in any direction of said tracer point, whereby movement of said pole piece induces voltages in said induction coil, means to supply a combined alternating and constant excitation to said electromagnetic coil, whereby a resultant voltage will be induced in said induction coil dependent partially upon the rate of displacement of said pole piece and partially upon the distance moved by said pole piece, and circuits energized by said resultant voltage to control operation of one of said machine operating motors.

5. A tracer controlled machine tool having motor operated movable members comprising in combination, a tracer body member, a tracer point mounted therein for movement in any direction, an electro-magnetic coil within said body member, an induction coil disposed coaxially with said first coil, a pole piece moved axially within said coils by movement in any direction of said tracer point, whereby movement of said pole piece induces voltages in said induction coil, means to supply a combined alternating and constant excitation to said electro-magnetic coil, whereby a resultant variable voltage will be induced in said induction coil dependent partially upon the rate of displacement of said pole piece and partially upon the axial distance moved by said pole piece, and circuits energized by said resultant voltage to control operation of one of said machine operating motors.

6. A tracer controlled machine tool having motor operated movable members comprising in combination, a tracer body member, a tracer point mounted therein for movement in any direction, an electro-magnetic coil within said body member, an induction coil adjacent said first mentioned coil, a pole piece within said coils movable in one direction by movement in any direction of said tracer point, whereby movements of said tracer point and pole piece induce variable voltages in said induction coil, means to continuously supply alternating and constant excitation to said electro-magnetic coil whereby resultant voltages will be induced in said induction coil dependent upon the displacement and rate of displacement of said pole piece, and motor operating circuits energized by said resultant voltages therein, and motors for operating the machine tool members, one of said motors having its direction and speed of rotation controlled by said resultant voltage.

7. A tracer controlled machine tool having motor operated movable members, a tracer for controlling movement of one of said members, said tracer having a tracer point movable in any direction, an inductive device electrically sensitive to movement of said tracer point and having at least one coil, means to apply a combined alternating and constant excitation to said inductive device, motors for moving said members, controlling means to limit the maximum speed of one motor, and means controlling the relative speeds of said motors actuated by the resultant voltage in a coil of said inductive device.

8. A tracer controlled machine tool having motor operated movable members, a tracer having a tracer point movable in any direction, an inductive device electrically sensitive to movement of said tracer point, means to apply a combined alternating and constant excitation to said inductive device, motors for moving said members, controlling means for at least one of said motors actuated by a resultant voltage of said inductive device, pilot generators coupled to said motors, and means to apply rectified voltages created by rotation of said pilot generators to limit the current supplied to the armature of one of said motors to limit the speed thereof.

9. A tracer controlled machine tool having motor operated movable members, a tracer having a tracer point movable in any direction, an inductive device electrically sensitive to movement of said tracer point, means to apply excitation to said inductive device, motors for moving said members, controlling means for at least one of said motors actuated by a resultant voltage of said inductive device, pilot generators coupled to said motors, and means to apply rectified voltages created by rotation of said generators to limit the maximum speed of one motor and to vary the relative speeds of both motors.

10. A tracer controlled machine tool having motor operated movable members, a tracer having a tracer point movable in any direction, an inductive device electrically sensitive to movement of said tracer point, means to apply a combined alternating and constant excitation to said inductive device, motors for moving said members, controlling means for at least one of said motors actuated by a resultant voltage of said inductive device, pilot generators coupled to said motors, and means to apply rectified voltages created by rotation of said generators to limit the maximum speed of one motor and to vary the relative speeds of both motors.

11. A tracer controlled machine tool having motor operated movable members, a tracer having a tracer point movable in any direction, an inductive device electrically sensitive to movement of said tracer point, means to apply excitation to said inductive device, motors for moving said members, controlling means for at least one of said motors actuated by a resultant voltage of said inductive device, pilot generators coupled to said motors, and means to apply rectified voltages created by rotation of said pilot generators to limit the current supplied to the armature of one of said motors to limit the speed thereof.

12. In a control of the character described, a tracer having a stylus displaceable positively and negatively from a balanced position, means for translating displacement of the tracer stylus in either direction from said balanced position into E. M. F. of a magnitude depending upon the amount of the displacement, and other means for translating displacement of the tracer stylus into E. M. F., the magnitude of which is dependent upon the rate of tracer stylus displacement.

13. In a control for an electric motor, a tracer displaceable positively and negatively from a balanced position, a control circuit including a thermionic tube connected in the motor circuit to regulate the operation of the motor and governed by the control circuit, and an element driven by the tracer and through which the effect of the control circuit on the thermionic tube is coordinated with the tracer displacement, means driven by the tracer for generating an anti-hunt voltage the magnitude of which is proportional to the rate of tracer displacement, and means for applying the anti-hunt voltage to the circuit to modify its effect on the thermionic tube and thereby compensate for motor lag.

14. In a control for an electric motor; a tracer displaceable positively and negatively in either direction from a balanced position; a control circuit including a thermionic tube connected in the motor circuit to regulate operation of the motor and governed by the control circuit; two sources of E. M. F. of variable magnitude connected with the control circuit to supply control voltage thereto; and inductive means electrically sensitive to tracer displacement for adjusting the magnitude of the E. M. F. at one of said sources to a value proportional to the extent of tracer displacement and for giving the other source of E. M. F. a magnitude proportional to the rate of tracer displacement, so that the effect of the control circuit on the thermionic tube is a measure of the extent of tracer displacement modified by the rate of tracer displacement.

15. In a tracer controlled machine tool having motor operated movable members; a tracer having a stylus displaceable positively and negatively from a balanced position; means for translating displacement of the tracer stylus into E. M. F. of a magnitude depending upon the amount of displacement; means for translating displacement of the tracer stylus into E. M. F. the magnitude of which is dependent upon the rate of tracer stylus displacement; motors for moving said members; and controlling means for at least one of said motors governed jointly by said two E. M. F.

SAMUEL H. CALDWELL.
JACOB J. JAEGER.
RICHARD TAYLOR.